Aug. 24, 1965    R. A. HEISLER    3,202,311
BAIL EARS
Filed Aug. 30, 1963
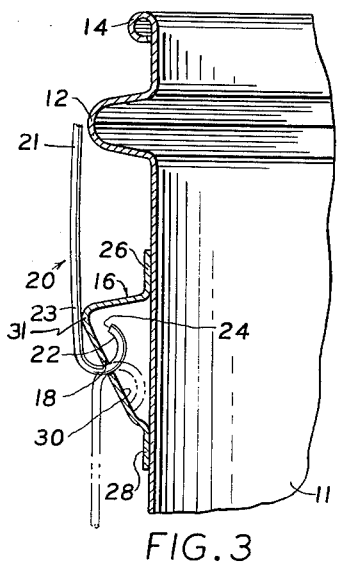
FIG. 3
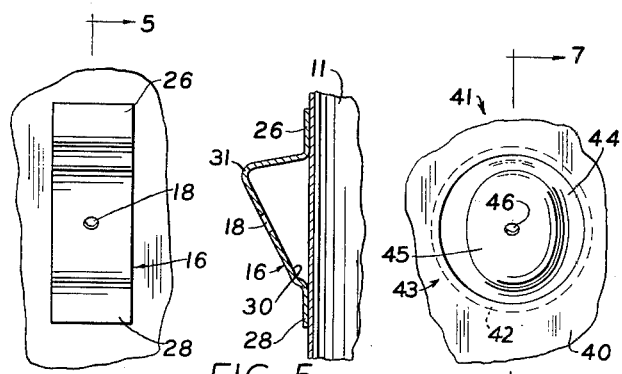
FIG. 4  FIG. 5
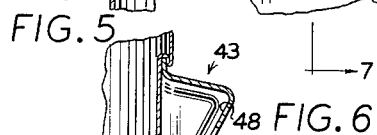
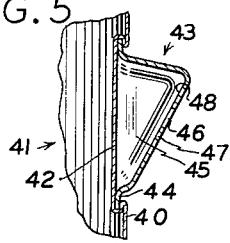
FIG. 6  FIG. 7
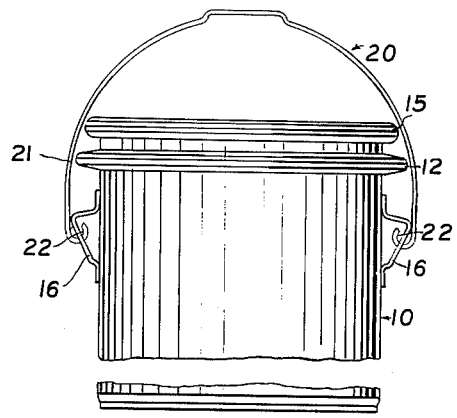
FIG. 1
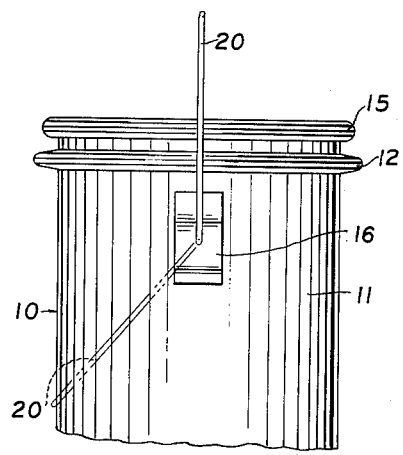
FIG. 2
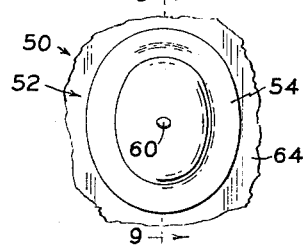
FIG. 8
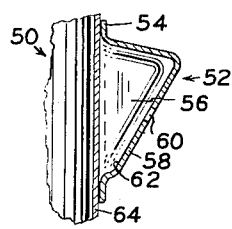
FIG. 9
INVENTOR.
Raymond A. Heisler 3,202,311
BAIL EARS
Raymond A. Heisler, Wayne, N.J.
(657 Dakota Trail, Franklin Lakes, N.J.)
Filed Aug. 30, 1963, Ser. No. 305,775
4 Claims. (Cl. 220—91)

This invention relates to improvements in bail ears mounted on cans or on containers and in particular to those containers having side walls generally formed with a chafe band or rub rim and more particularly to bail ears attached to said containers wherein the bail ear is formed with an outer wall portion sloped so as to provide a lateral motion to an attached bail when this bail is moved. This lateral motion when imparted to the bail effects the relative positioned relationship of the bail to the container.

This invention relates still more particularly to providing a bail ear whose outer wall is sloped upwardly and outwardly from the lower attached rim of the bail ear, the sloped wall providing an outwardly camming means for urging the bail away from the bailed container when in the carrying position and an inwardly camming means for urging the bail toward the bailed container when the bail is recumbently positioned against the side wall of the container.

The use of bails on cans and containers is well known and, so combined, provides therewith a convenience for grasping and carrying the bailed container. The bail ears as so provided have been used for more than a half-century and have conventionally been symmetrically constructed so as to be readily mounted on the container wall. Additionally these bail ears have been constructed so as to be used with a bail that can be readily applied by either hand means or by simplified mechanical assist. Bail ears of symmetrical construction must necessarily provide only a pivotal retaining means for the bail, and in no way is the relative position of the bail to the container controlled by this bail ear. It is also to be noted that these conventional bails mounted in conventional ears may be easily disengaged therefrom, often with disconcerting results.

The larger cans or containers that are used today, such as the five-gallon cans, usually have a chafe band or rub rim formed in the sidewall adjacent the top of the can. This chafe band is more particularly used on those cans having covers that are affixed by means of tabs, as this chafe band not only protects the cover from engagement with adjoining containers but also prevents the bail from engaging and dislodging the cover.

A conventional bail mounted in a conventional bail ear so that it may be easily brought into carrying position without undue engagement with the chafe band heretofore required a bail that in a repose position also laid with the portion adjacent to the ear extending outside the protective area of the chafe rim. A large portion of the containers now used has the sides painted, lithographed or otherwise decorated to display advertising of the contents and/or to have a rust proofing surface thereon. When shipping and stacking these bailed containers, each having the handles protruding beyond the rub rim, the protruding portions of the recumbent bail often scratch and mar the sides of adjacent containers.

In my invention it is contemplated that a bail ear and bail be so constructed and assembled so as to provide a combination wherein the bail may be easily moved to the carrying position in a manner to avoid or nearly avoid the chafe ring, and in the recumbent position the bail will lie sufficiently close to the container to be protected by the chafe ring from contact with adjoining containers, cartons and the like.

It is further contemplated that the bail and bail ears may be economically made and mounted on the container and that the bail so installed will be virtually loss proof.

My invention therefore contemplates the use of a bail formed in one plane and in a manner and by means described in my co-pending patent application, Serial No. 223,015 filed Sept. 12, 1962. To provide mounting means for this bail, my invention includes an ear which in a new and novel manner engages the inner end of the bail and an adjacent outer portion thereof to urge the bail toward the sides of the container when the bail is in a recumbent position and away from the container when the bail is raised to carrying position. This ear as contemplated is made with one sloped surface which has therein a mounting hole for the bail. This surface, when the ear is attached, is sloped so as to extend upwardly and outwardly from the bottom of the can. The end of the mounted bail within the ear is disposed to engage the inner lower sloped surface of the ear and to be cammed so as to be urged inwardly toward the sidewall of the container. When raised to carrying position, the bail engages the outer upper sloped surface of the ear and is urged outwardly away from the nearby chafe.

There has been outlined rather broadly the most important features of the present invention in order that a detailed description thereof that follows may be better understood and in order that the present contribution to the art may be better appreciated. There are, of course, additional features of the invention that will be described hereafter and which will form the subject of claims appended hereto. Those persons skilled in the art will appreciate that the conception on which the present disclosure is based may readily be utilized as the basis for designing other structures for carrying out the several purposes of this invention. It is important, therefore, that the claims be regarded as including such equivalent constructions as do not depart from the concept and scope of this invention.

A preferred embodiment and modification thereof of my invention has been chosen for purposes of illustration and description and is shown in the accompanying drawing, forming a part of the specification wherein:

FIGURE 1 is a partial front view of a container with a bail mounted in the ears illustrating my invention;

FIG. 2 is a partial side view of the container of FIG. 1 with a bail mounted thereon;

FIG. 3 is an enlarged sectional view of the ear mounted on the container and with a bail inserted therein;

FIG. 4 is an enlarged side view of the ear mounted on the container;

FIG. 5 is a sectional view on the line 5—5 of FIG. 4;

FIG. 6 is a side view of an alternate ear construction with the ear mounted on a container;

FIG. 7 is a sectional view taken on the line 7—7 of FIG. 6;

FIG. 8 is a side view of a further alternate ear construction with the ear soldered to the container side; and FIG. 9 is a sectional view taken on the line 9—9 of FIG. 8.

Referring now more particularly to the drawing, the assembly of FIGS. 1 through 5 includes a container 10 which as exemplified is of sheet metal construction wherein a side 11 has formed therein adjacent to the open top a chafe or rub band 12 which may be made by distending the metal from the nominal plane of the side 11 into an outwardly-extending arcuate terminating band. This side is then continued to the open top where it is conventionally formed into a safe-rolled edge 14. A cover 15 (FIGS. 1 and 2) also of conventional construction is used to close and cover the container 10. Below the chafe band 12 and attached to the side 11 is a bail ear 16 which, as reduced to practice, is formed from a strip of sheet metal and is conventionally used in pairs in which one each is mounted on diametrically opposed sides of the container. A bail-receiving opening 18 is formed in the ear, this opening being adapted to receive and rotatably retain a bail 20 therein. The bail, as shown, may be made of wire with each end thereof formed into an incomplete loop 22 by apparatus described in my co-pending patent application, Serial No. 223,015 filed September 12, 1962. A bail so formed has a loop 22 wherein an end 24 thereof is continued to a point approximately 240 to 260 degrees from the start of the bend. The ear in the present instance is attached by means of upper tab 26 and lower tab 28 to side wall 11 by means such as soldering or spot welding. The ear 16 as formed and attached has an intermediate portion disposed at an angle to the container with an inner surface 30 sloping upwardly and outwardly from tab 28.

In FIGS. 6 and 7 is shown an alternate embodiment in which an ear having a closed pocket may be mounted in a pocket formed in the side walls and with the container side walls then pressed down upon the ear thereby clamping the ear in the pocket. In the explication shown the side wall 40 of the container 41 has formed therein a recessed portion 42. An ear 43 is formed with a flange 44. A pocket portion 45 has therein a bail opening 46 in sloped wall 47 the inner surface 48 of which is similar in slope and purpose to slope 30 of ear 16. Side 40 is caused to be turned over the flange 44 to lock ear 43 in place.

In FIGS. 8 and 9 a further alternate embodiment is shown in which a closed ear similar to the ear of FIGS. 6 and 7 is attached to the container 50 by soldering. An ear 52 is formed with a flange 54, a pocket 56 with a sloped outer wall 58 and a bail opening 60 and an inner sloped surface 62. By a soldering or similar operation the ear 52 is attached to the side wall 64.

USE AND OPERATION

The various embodiments of the containers described above are prepared for use by the attachment of a pair of ears such as 16, 43 or 52, each pair of ears being precisely located and mounted with one ear being on opposite exterior side portions of the container. A wire bail 20 is formed and inserted in the ears, each end of the bail being formed in a loop 22 which is left incomplete. This preferred bail is curved into a generally U-shape, the curve being carried nearly to the ear so that when the bail is in the position as shown in FIGS. 1 and 3 the curve of the bail permits a bail portion 21 to pass close to the chafe ring 12. The bail openings 18, 46 and 60 are preferred to be made about one-fourth larger than the diameter of the bail wire which wire for a five-gallon container may be one-eighth inch in diameter. The openings, therefore, may be made about five thirty-seconds inch in diameter which permits the easy insertion of the bail end yet freely confines the looped end so that the bail is able to be swung only in an arc. As the bail is brought into the recumbent position shown by phantom outline in FIG. 2, the end 24 of bail loop 22 engages the sloped surface 30. This portion between the surface 30 and opening 18 acts as a short lever causing the adjacent bail portion to bend inwardly a slight amount. At the same time the loop portion is urged inwardly so that a greater amount is within the ear as shown in phantom outline in FIG. 2. The recumbent bail by this combination of movement is caused to lie adjacent to the container in a manner so as to extend less than the chafe ring 12.

When the bail is brought into the lift or carry position, the loop end 24 moves away from slope 30 and bail portion 23 moves into engagement with the outer surface of the shoulder portion 31 of ear 16 whence the preformed curve of bail 20 with the additional outward urge provided by the shoulder 31 of ear 16 causes the bail to assume the position shown in solid outline in FIG. 3.

It is to be noted that the ears 43 and 52 operate with a bail in precisely the same manner as with the ear 16. The ears exemplified are preferred to be made and attached so as to protrude from the side wall a distance only slightly less than the outermost portion of chafe ring 12. In this manner adjacent containers, walls or shelf walls are protected by the chafe rim and the container is able to be packed in cartons with other like containers, the bails of each container avoiding entanglement with adjacent bails.

The terms "upwardly," "top" and other terms referring to a vertical direction as used herein refer to a situation wherein the bottom of the container is horizontal, and not necessarily to a position in which the container may be used.

Having described my invention with some particularity, the above disclosure is by way of illustration, and although a preferred embodiment and modification thereof have been shown and described, it will of course be understood that various other modifications may be devised by those skilled in the art which will embody the principles of the invention as found in the true spirit and scope of the appended claims.

I claim:

1. An earred container having ears attached on oppositely disposed sides of the container the ears receiving and retaining a U-shaped bail having inwardly formed curved ends, the bail and ends being in a common plane, the earred container and bail in combination comprising: (1) a container having a side wall terminating in a top rolled edge; (2) oppositely disposed bail receiving ears attached to the side of the container at a predisposed distance below the top rolled edge, each bail ear being attached to the side of the container by at least the ear's upper and lower portion, the ear being further characterized in that each attached ear has a sloped portion intermediate its attached upper and lower portion, said sloped portion of the attached ear extending upwardly and outwardly from the lower attached portion; (3) a bail-receiving aperture of preselected size formed in the sloped ear portion, the aperture being formed intermediate the upper and lower attached portion; and (4) a U-shaped bail having inturned ends curved to enter the bail receiving aperture in the ear, each end being formed in an incomplete loop, said bail being further characterized in that as mounted in the ears and with the plane of the bail substantially parallel to the top rolled edge of the container, the bail will have an absence of bias for the ends to move in a direction in said plane, and the bail and ear being further characterized in that when assembled each end of the inturned loop of the recumbent bail will engage a lower inner surface of the sloped element of the ear and a portion of the curved bail end will engage a shoulder portion of the aperture and with this shoulder as a fulcrum bend the U-portion of the bail into a lesser arc, and in an amount sufficient to bend the bail so as to cause the bail to lie closer to the container side wall and with such bending bias to cause the bail to be frictionally retained by the engagement of the end of the bail with the sloped portion of the ear and in this recumbent position until moved therefrom by manipulation of the bail and further characterized in that said bail when moved to a carrying position will engage the upper outer surface of the sloped ear and by engagement of the curved bail end and the upper outer surface of the ear to bow the bail into a greater arc and in an amount sufficient for the bail to occupy a position away from the container upper rim.

2. An earred container as in claim 1 in which the container side wall has a bead formed adjacent the rolled edge and in which the bail in the lift position is bowed by the bail ear to a position away from the bead and container rim.

3. A bail ear as in claim 2 wherein the ear is formed from a strip of metal.

4. A bail ear as in claim 2 wherein the ear is a closed flanged metal pocket.

References Cited by the Examiner

UNITED STATES PATENTS

| | | | |
|---|---|---|---|
| 211,036 | 12/78 | Napheys | 220—91 |
| 1,353,080 | 9/20 | Smith | 220—91 |
| 1,862,730 | 6/32 | Wendle | 220—96 |
| 1,883,823 | 10/32 | Renshaw | 220—91 |
| 2,106,175 | 1/38 | Hothersall | 220—91 |
| 2,144,661 | 1/39 | Nelson | 220—96 |
| 3,170,592 | 2/65 | Ullman et al. | 220—91 |
| 3,170,593 | 2/65 | Ullman et al. | 220—91 |

THERON E. CONDON, *Primary Examiner.*